US008934845B2

(12) United States Patent
Weng

(10) Patent No.: US 8,934,845 B2
(45) Date of Patent: Jan. 13, 2015

(54) RADIO STATION LIST MANAGEMENT

(75) Inventor: Jianfeng Weng, Kanata (CA)

(73) Assignee: BlackBerry Limited, Waterloo (CA)

( * ) Notice: Subject to any disclaimer, the term of this patent is extended or adjusted under 35 U.S.C. 154(b) by 208 days.

(21) Appl. No.: 13/476,233

(22) Filed: May 21, 2012

(65) Prior Publication Data

US 2013/0309978 A1 Nov. 21, 2013

(51) Int. Cl.

*H04W 24/00* (2009.01)
*H04B 1/18* (2006.01)
*H04B 1/38* (2006.01)

(52) U.S. Cl.

USPC .................. 455/67.11; 455/185.1; 455/553.1; 455/161.1; 455/161.2; 455/186.1; 455/186.2

(58) Field of Classification Search

CPC ......... H07L 1/009; H07L 1/003; H03J 1/008; H03J 9/002; H03J 1/187; H03J 1/20; H04B 1/26; H04L 1/0003; H04L 1/0009

See application file for complete search history.

(56) References Cited

U.S. PATENT DOCUMENTS

| | | | | |
|---|---|---|---|---|
| 4,298,851 | A * | 11/1981 | Shichijo et al. | 334/11 |
| 6,748,237 | B1 * | 6/2004 | Bates et al. | 455/553.1 |
| 7,587,185 | B2 | 9/2009 | Nee | |
| 7,623,824 | B2 * | 11/2009 | Anttila et al. | 455/3.06 |
| 7,715,782 | B2 | 5/2010 | Van Hoff et al. | |
| 8,023,914 | B2 | 9/2011 | Ruan et al. | |
| 8,073,412 | B2 | 12/2011 | Jaisimha et al. | |
| 2003/0013425 | A1 | 1/2003 | Nee | |
| 2003/0032400 | A1 | 2/2003 | Tsubaki et al. | |
| 2003/0100331 | A1 * | 5/2003 | Dress et al. | 455/550 |
| 2004/0198282 | A1 | 10/2004 | Heiderscheit et al. | |
| 2007/0123185 | A1 * | 5/2007 | Welk et al. | 455/166.2 |
| 2008/0039037 | A1 | 2/2008 | Kum | |
| 2008/0188193 | A1 | 8/2008 | Doudnikoff et al. | |
| 2009/0143035 | A1 | 6/2009 | Jaisimha et al. | |
| 2009/0197554 | A1 * | 8/2009 | Shi et al. | 455/226.2 |
| 2009/0270058 | A1 | 10/2009 | Cheng | |
| 2010/0150276 | A1 * | 6/2010 | Yew et al. | 375/340 |
| 2010/0166122 | A1 * | 7/2010 | Pahuja et al. | 375/344 |
| 2010/0178938 | A1 * | 7/2010 | Ingrassia et al. | 455/456.3 |
| 2010/0273440 | A1 * | 10/2010 | Bu | 455/142 |
| 2010/0285763 | A1 * | 11/2010 | Ingrassia et al. | 455/185.1 |
| 2010/0304697 | A1 | 12/2010 | Yoon | |
| 2011/0207423 | A1 * | 8/2011 | Tarte | 455/186.1 |
| 2011/0281538 | A1 * | 11/2011 | Morrison et al. | 455/185.1 |

FOREIGN PATENT DOCUMENTS

| | | |
|---|---|---|
| JP | 2009111602 | 5/2009 |

OTHER PUBLICATIONS

European Search Report, EP12168744, Aug. 28, 2012.

* cited by examiner

*Primary Examiner* — Nguyen Vo
*Assistant Examiner* — Ralph H Justus

(57) ABSTRACT

The present disclosure provides radio station list management in a wireless receiver. Upon detection of a scan event, a plurality of radio broadcast channels is scanned to detect available radio stations. Available radio stations that fail to meet a preference criterion are identified and removed to form a list of preferred radio stations. The scan event may be generated dependent upon a time, a location of the wireless receiver, or a broadcast signal quality. Preference criteria may include station content classification and signal quality.

19 Claims, 4 Drawing Sheets

RADIO STATION LIST MANAGEMENT

BACKGROUND

The availability of FM radio stations, or other radio broadcast stations, varies with geographical location. Prior techniques for selecting preferred stations are additive, meaning that selected radio stations may be assigned to preset buttons and thus added to a list of favorite stations. This may be done by performing a scan of available channels and playing each available channel or a short period of time, during which a user may press and hold a preset button to assign the station being played to the selected preset button. In this way, a selected station is added to the list of stations accessible via the preset buttons. Still further, a computer application or program may perform an automatic scan of radio stations to produce a list of available stations. A user may then select stations from the list of available stations to be added to a list of favorite stations. In both of these examples, the station scan is initiated by the user, and radio stations must be selected one at a time by the user to be added to a list of stations.

It would be useful to provide an improved method for managing a station list.

BRIEF DESCRIPTION OF THE DRAWINGS

Exemplary embodiments of the present disclosure will be described below with reference to the included drawings such that like reference numerals refer to like elements and in which.

DETAILED DESCRIPTION

Figure 1:
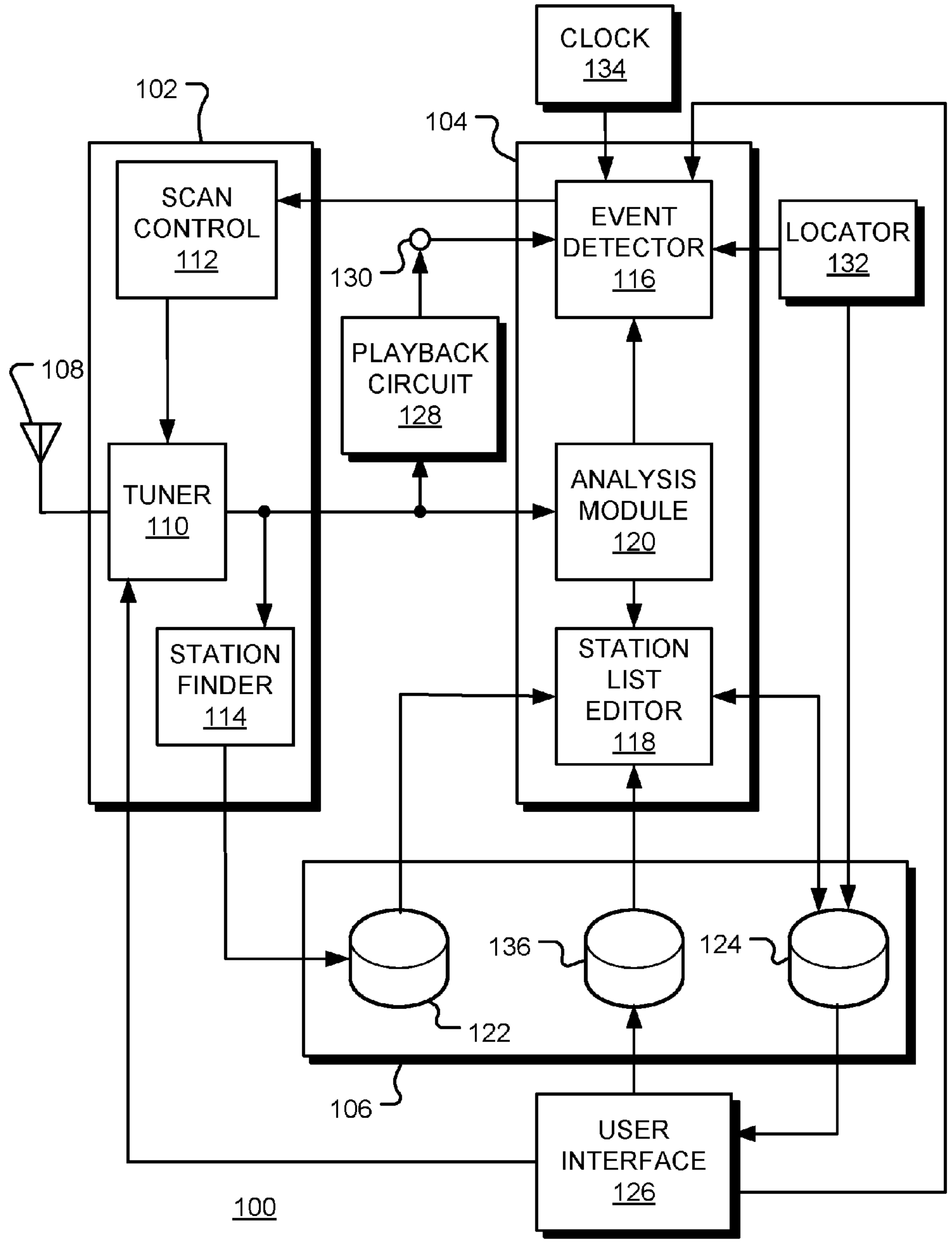
FIG. 1 is a block diagram of a communications system, in accordance with illustrative embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments described. The description is not to be considered as limited to the scope of the exemplary embodiments shown and described herein.

The present disclosure relates to the management of one or more radio station lists in a wireless receiver. The wireless receiver may be, for example, a dedicated receiver, a cellular telephone, a personal digital assistant (PDA), a tablet, laptop or other computer, or some other portable electronic device. In one illustrative embodiment, a list of preferred radio stations is maintained in the wireless receiver. Upon detection of a scan event, a tuner scans a band of frequencies to detect available radio stations and forms a list of available radio stations. Radio stations that fail to meet a preference criterion are removed from the list of available radio stations to form the list of preferred radio stations. The list of preferred radio stations is stored in a memory and may be accessed by a user to select a radio station for playback.

FIG. 1 is a block diagram of a wireless receiver in accordance with various aspects of the present disclosure. The wireless receiver 100 includes a scanner 102, a processor 104, a memory 106 and a radio antenna 108. The scanner 102 includes a tuner 110, a scan controller 112 and a station finder 114. The processor 104 includes an event detector 116, a station list editor 118 and an analysis module 120. The elements of the processor 104 may be implemented as software modules executed by the processor. The tuner 110 receives a broadcast radio signal from the radio antenna 108.

The broadcast radio signal content may be imbedded using frequency modulation (FM), amplitude modulation (AM) or other modulation scheme apparent to those of skill in the art. In the sequel, the broadcast channels of the various radio stations are described as being multiplexed using frequency division multiplexing. However, other channel or station multiplexing, such as time division multiplexing or code division multiplexing may be used. In such cases, scanning over a band of radio frequencies is considered to be equivalent to scanning over a plurality of multiplexed radio channels.

When the event detector 116 detects a scan event, the scan controller 112 is activated causing the tuner 110 to scan a range of radio frequencies. The station finder 114 monitors the output from the tuner 110. If a radio station is found at a particular frequency being scanned, characteristics of the radio station, including its broadcast frequency, are stored in memory region 122 of the memory 106 to form a list of available radio stations. Other information, such as the geographical location of the receiver, the time the station was found, and/or information from a Radio Data System (RDS) subcarrier signal may also be stored in the memory 122. The station list editor 118 accesses the memory 122, identifies radio stations of the list of available radio stations that fail to meet one or more preference criteria and removes those radio stations from the list of available radio stations. The remaining stations, which meet the preference criteria, are stored in memory region 124 as a list of preferred radio stations.

A user interface 126 enables a user of the wireless receiver to access the list of preferred radio stations in memory region 124 of the memory 106, retrieve the frequency of the station and control the tuner 110 to select a desired radio station for playback using playback circuit 128. The user interface may comprise, for example, dedicated buttons or other physical controls, a voice interface, or a graphical user interface displayed on a display screen.

The analysis module 120 is monitors the output from the tuner 110. This output is the demodulated signal from the selected radio station. A variety of analyses may be performed by the analysis module 120. For example, the signal may be analyzed for signal strength and/or other signal quality characteristics. The signal may be analyzed to determine a content classification.

The playback circuit 128 is responsive to the output from the tuner 110 and may include, for example, a signal driver circuit for a loudspeaker or for an ear-phone output socket 130.

In one exemplary embodiment, the event detector 116 monitors the ear-phone socket 130 and initiates a new scan when an ear-phone is plugged into the socket 130.

In a further example, the event detector 116 receives information, relating to the geographic location of the wireless receiver, from a locator 132. The locator 132 may be a Global Positioning System (GPS) receiver. The locator may access a Cell Identifier of a cellular telephone system. In a cellular network, each base transceiver station (BTS) broadcasts both a Local Area Identifier (LAI) and a Cell Identifier to its cells. A wireless receiver within a cell can approximate its actual location using the geographical coordinates of the corresponding BTS. Similarly, the locator 132 may determine an approximate location from a Media Access Control (MAC) Identifier or other identifier received from a nearby wireless network node positioned at a known location.

In a still further illustrative embodiment, the event detector 116 receives time information from a clock or timer 134. For example, the event detector 116 may initiate a new scan at regular intervals or when the time since the last scan exceeds a limit.

The user interface 126 may be configured to enable a user to store a set of user preferences in memory region 136 of memory 106. The user preferences may include station content classifications, for example. In one exemplary embodiment, the user preferences include one or more content classifications that the user does not wish to be included in the list of preferred stations. The station list editor 118 accesses user preference memory 136 and removes stations with the specified content classifications from the list of preferred radio station. For example, a user may wish to avoid talk radio stations or country music stations, so stations with these content classifications are removed from the list. In another example, the user preferences include all one or more content classifications that the user prefers, in which case with stations with other content classifications are removed from the list of preferred stations by the station list editor 118.

The analysis module 120, the locator 132, the clock or timer 134, and the ear-phone detector associated with ear-phone socket 130 are all examples of automatic scan event generators that are capable of automatically triggering the scanner 102 to perform a new scan for radio stations. User Interface 126 provides a manual scan event generator that may be employed to initiate a scan. Other scan event generators will be apparent to those of ordinary skill in the art.

The processor 104 may be controlled by computer-executable instructions stored in a non-transitory computer-readable medium such as memory 106. In some exemplary embodiments, the instructions, when executed by the processor, cause the processor to detect a scan event and, upon detection of the scan event, scan a plurality of potential broadcast radio channels to detect available radio stations. For example, the scanner may scan a frequency band to detect stations multiplexed by frequency. Further instructions cause the processor to identify radio stations of the available radio stations that fail to meet a preference criterion, remove the identified radio stations to form the list of preferred radio stations, and store the list of preferred radio stations in a memory accessible to the processor.

Figure 2:
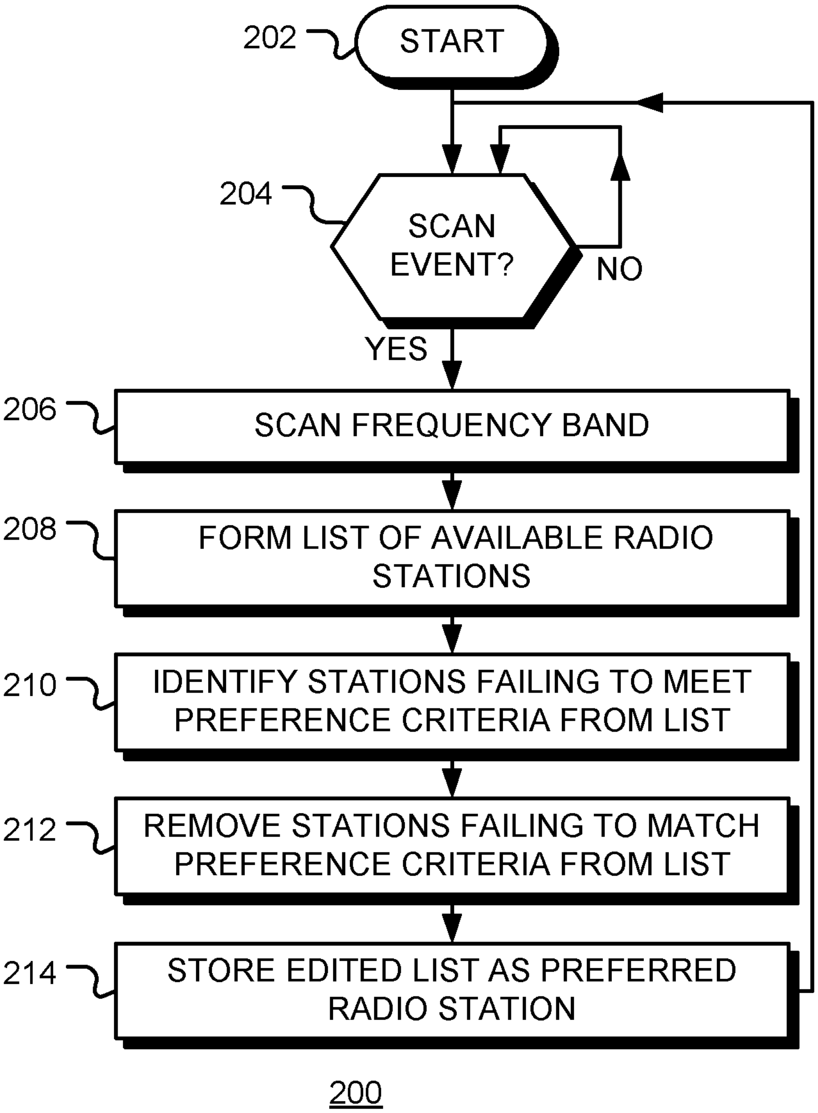
FIG. 2 is a flow chart of a method of storing a list of preferred radio stations in accordance with some exemplary embodiments of the present disclosure.

FIG. 2 is a flow chart of a method 200 of storing a list of preferred radio stations in a wireless receiver. The method begins at start block 202. If a scan event is detected, as depicted by the positive branch from decision block 204, a band of radio frequencies is scanned at block 206 to detect available radio stations. Each scanned frequency is monitored to determine if a radio station is available at that frequency, resulting in the formation of a list of available radio stations at block 208. At block 210, radio stations that fail to meet a preference criterion are identified and, at block 212, the identified radio stations are removed from the list of available radio stations to form the list of preferred radio stations. The list of preferred radio stations is stored in a memory at block 214, and flow returns to decision block.

A scan event may comprise the connection of an ear-phone to the ear-phone socket. That is, a new scan may be performed when an ear-phone is plugged into the wireless receiver. A new scan may also be performed if a time since a prior scan has elapsed, or if a signal quality of the radio station being listened to falls below a set threshold. A scan event may comprise a change in location. For example, a current location of the wireless receiver may be compared to a location where a previous scan was performed. If the locations are sufficiently far apart, a new scan may be triggered and the list of preferred radio stations is updated. A new scan may also be performed when requested by a user via a user interface of the wireless receiver.

One or more preference criteria may be used to determine which radio stations should be removed from, or retained in, the list of available radio stations. Example criteria include: a minimum threshold of signal quality, the preferred content classifications, and content classifications to be removed. Content classification include, for example, ‘talk radio’, ‘news’, ‘jazz’, ‘rock’, ‘country’, ‘religious’, ‘sports’, ‘music’, etc. In one embodiment, a content classification is determined from a database of classifications indexed by broadcast frequency or channel. In a further embodiment, the content classification is determined from an analysis of signals broadcast from the radio stations. In a still further embodiment, the content classification is determined from Radio Data System (RDS) subcarrier signals broadcast from the radio stations.

Invalid radio stations, that is, stations having no content, may also be removed from the list of available radio stations.

In some exemplary embodiments, a locator is used to determine the geographic location of the wireless receiver when a scan is made. The list of preferred radio stations may include a broadcast frequency of each radio station and the location of the wireless receiver when the scan was made.

Figure 3:
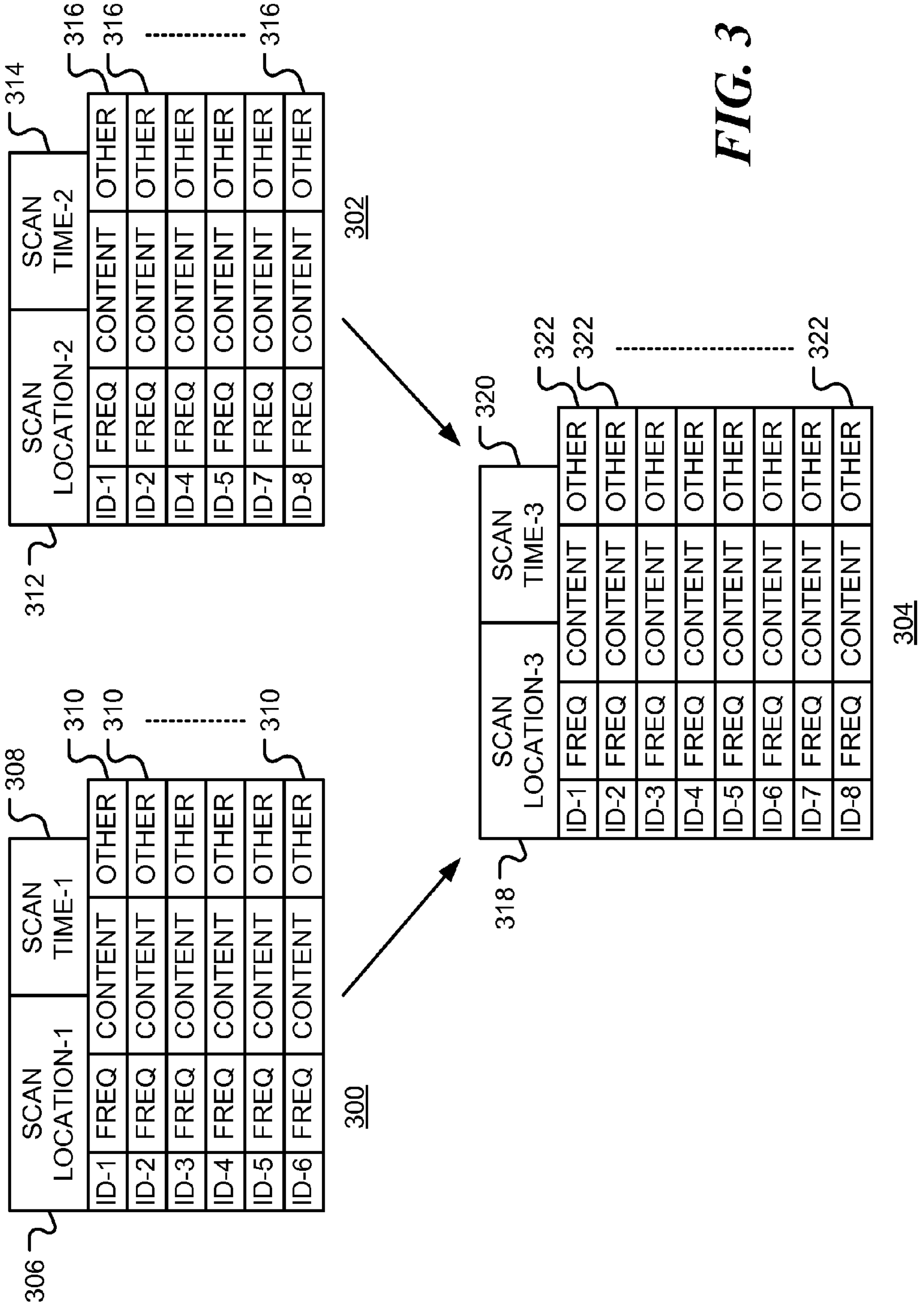
FIG. 3 is a diagrammatic representation of several exemplary lists of preferred radio stations in accordance with illustrative embodiments of the present disclosure.

FIG. 3 is a diagrammatic representation of several exemplary lists of preferred radio stations. The figure shows a first list 300, a second list 302 and a third list 304. Each entry of the first list 300 includes a scan location 306 and a scan time 308, that record where and when the first list was formed. Each entry 310 in the list 300 includes a broadcast frequency (or equivalently the broadcast channel) of the radio station. Optionally, each entry may also include a station identifier, a content classification and/or other information associated with the station (such as the number of times a station has been accessed). The stations may be sorted in an ascending or descending order according to the broadcast frequency associated with each station or according to the number of times that each station has been accessed. In a further illustrative embodiment, the scan location and scan time may be listed in each entry 310. The second list 302, which was formed at a different scan location 312 and at a different scan time 314, has a similar structure to that of the first list. The second list includes a number of entries 316, each relating to a preferred radio station.

In one exemplary embodiment, the first list of preferred radio stations 300 and the second list of preferred radio stations 302 are compared. If the lists are found to be substantially similar, the first and second lists are combined or merged to form a third list of preferred radio stations 304. Lists of preferred radio stations may be determined to be substantially similar if they have a number of entries in common. The third list of preferred radio stations 304 comprises a combination of the first and second lists of preferred radio stations. In the example shown in FIG. 3, stations with identifiers ID-1, ID-2, ID-4 and ID-5 are common to both the first list and the second list. The scan location 318 of the third list may be a mid point between the locations 306 and 312. The scan time 320 of the third list 304 may be the later, or earlier, of the scan times 308 or 314, or some other time, such as the time the third list was formed, for example. The entries 322 in third list 304 include all of the entries from the first list 300 and the second list 302, but redundant entries have been removed to avoid duplication. Combining the lists reduces the number of lists and reduces the amount of memory required to store the lists.

The process of combination may be repeated. For example, the third list 304 may itself be combined with another substantially similar list.

Once one or more lists of preferred radio stations are formed, the user may select a radio station from the list for playback. If multiple lists are formed, the list made at the location closest to the current location may be presented to the user as a default list.

An entry within a list may be designated as a default selection. When the wireless receiver is switch on, the preferred list may be selected dependent upon the location of the wireless receiver, and the default selection in that list may be selected as the initial radio station to be played back.

Figure 4:
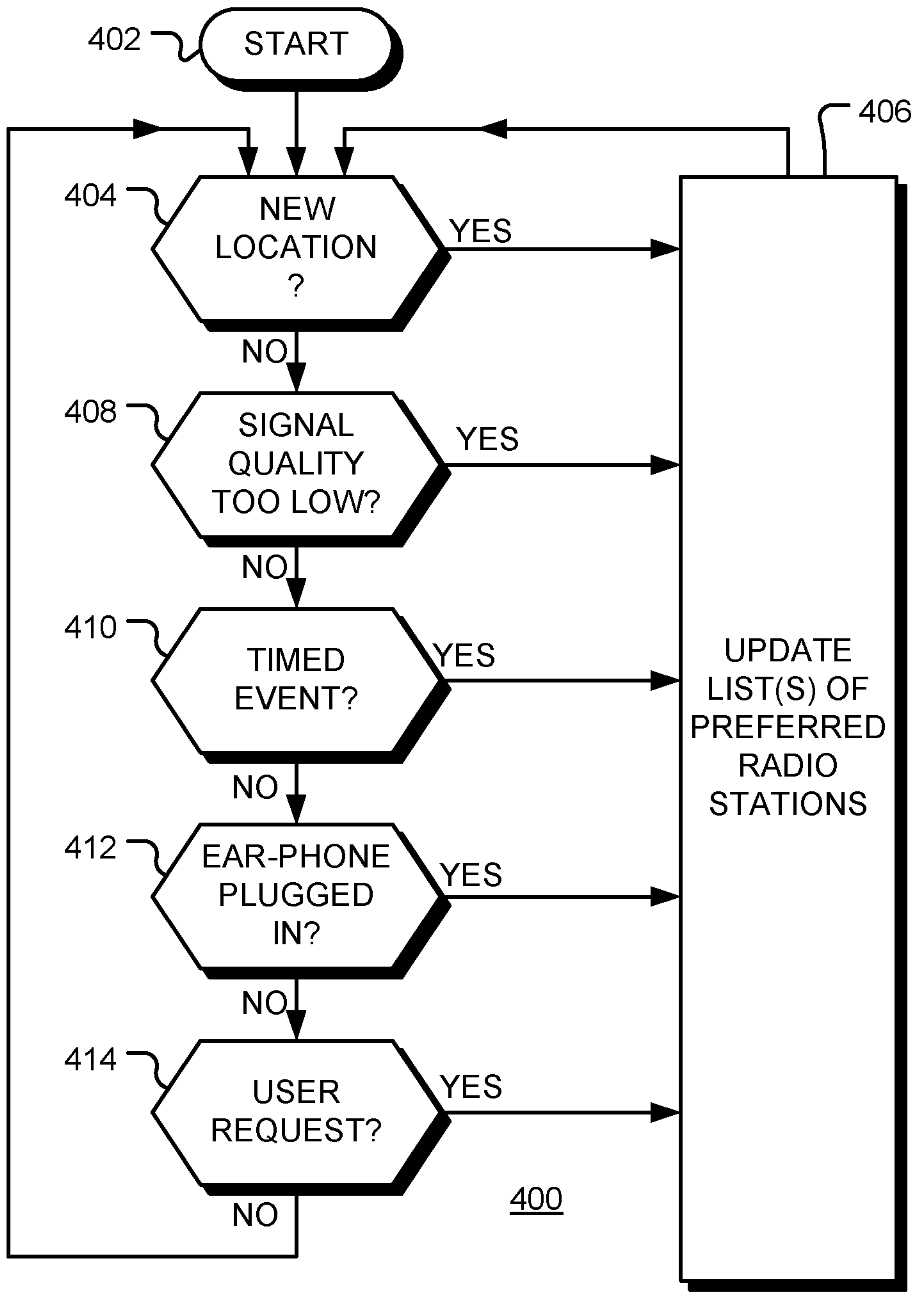
FIG. 4 is a flow chart of a method for triggering a scan of available radio stations in accordance with certain aspects of the present disclosure.

FIG. 4 is a flow chart of a method for triggering a scan for available radio stations in accordance with exemplary embodiments of the present disclosure. The method 400 allows one more lists of preferred radio stations to be updated when various scan events are detected and a scan is conducted. A particular exemplary embodiment may detect one or more types of scan events. Following start block 402 in FIG. 4, a check is made at decision block 404 to determine if the geographical location of the wireless receiver has changed exceeding a set amount from a previous scan position. If the location has changed by more than the set amount, as depicted by the positive branch from decision block 404, a scan is conducted and then one or more lists of preferred radio stations are updated at block 406. If the position has not changed sufficiently, flow continues to decision block 408 where the quality of one ore more radio signals is checked. If the user is listening to a radio station, the quality of the radio signal of that radio station is monitored. If the quality of the signal is below a set threshold, as indicated by a quality measure, the user may be asked if he or she wishes a new scan of radio stations to be conducted. Upon a positive answer from the user, a scan is conducted and then one or more lists of preferred radio stations are updated at block 406, as indicated by the positive branch from decision block 408. Otherwise, a scan is not conducted and the user continues listening to the radio station. If the user is not listening to a radio station, the default radio station may be monitored or, alternatively, each of the radio stations in the list associated with the current location may be monitored in turn. In one exemplary embodiment, if quality falls below the set threshold, the monitored station is removed from the list associated with the current location. Alternatively, a new scan may be performed. If the quality of the signal is above the set threshold, as indicated by the negative branch from decision block 408, flow continues to decision block 410 where a check is performed to see if a timed event has occurred. For example, the timed event may be a scheduled time, such as every hour at 10 minutes past the hour, or a relative time, such as 30 minutes after a previous scan. If a timed event has occurred, as depicted by the positive branch from decision block 410, a scan is conducted and then the list of preferred radio station is updated at block 406, otherwise, flow continues to decision block 412. At decision block 412 the action of connecting an ear-phone to the wireless receiver is detected. If an ear-phone connection is detected, as depicted by the positive branch from decision block 412, a scan is conducted and then the list of preferred radio station is updated at block 406. Otherwise, flow continues to decision block 414 where user requests are detected. A scan event may be requested by a user. For example, a user may interact with a graphical user interface of the wireless receiver or press a designated button on the wireless receiver to generate a scan request. If a user request is received, as depicted by the positive branch from decision block 414, a scan is conducted and then the list of preferred radio station is updated at block 406. Otherwise, flow returns to block 404 to detect other scan events. A particular embodiment may be configured to detect one or more of the scan events shown in FIG. 4. Scan events other than the examples depicted in the figure may also be detected.

Scan events may be detected in combination. For example, a new scan may be performed if an ear-phone and the wireless device is in a new location, or a new scan may be performed if 25 minutes have elapsed since the last scan, and the earphone is plugged in.

The wireless receiver disclosed above may be a dedicated radio receiver or a cellular telephone, a personal digital assistant (PDA), a tablet, laptop or other computer, or some other portable electronic device able to receive radio broadcasts.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described exemplary embodiments may be combined to create alternative embodiments not explicitly shown and described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of managing preferred radio stations in a wireless receiver, the method comprising:

in response to detecting a scan event, scanning a plurality of radio broadcast channels to detect available radio stations of the plurality of radio broadcast channels;

identifying radio stations of the available radio stations that fail to meet a preference criterion;

removing the identified radio stations from the available radio stations to form a list of preferred radio stations that meet the preference criterion; and storing the list of preferred radio stations;

where detecting the scan event comprises detecting at least one of the following events:

connection of an ear-phone to a playback circuit of the wireless receiver; and detecting signal quality below a set threshold, and where storing the list of preferred radio stations comprises:

storing a broadcast channel of each radio station in the list of preferred radio stations; and storing a location of the wireless receiver, the method further comprising:

comparing a first list of preferred radio stations stored at a first location with a second list of preferred radio stations stored at a second location; and replacing the first and second lists of preferred radio stations with a third list of preferred radio stations if the first and second lists of preferred radio stations have a predetermined number of entries in common;

where the third list of preferred radio stations includes a combination of the first and second lists of preferred radio stations.

2. The method of claim 1, where detecting the scan event further comprises:

determining a location of the wireless receiver; and comparing the location of the wireless receiver to a previous location of the wireless receiver associated with a previous scan event.

3. The method of claim 1, where identifying radio stations of the available radio stations that fail to meet the preference criterion comprises:

identifying radio stations having signal quality below a threshold.

4. The method of claim 1, where identifying radio stations of the available radio stations that fail to meet the preference criterion comprises:

identifying radio stations having a content classification that does not match a selected content classification.

5. The method of claim 4, where the content classification is determined from a database of classifications.

6. The method of claim 4, where the content classification is determined from an analysis of a signal broadcast from the radio station.

7. The method of claim 4, where the content classification is determined from Radio Data System (RDS) subcarrier signals broadcast from the radio stations.

8. The method of claim 1, where identifying radio stations of the available radio stations that fail to meet the preference criterion comprises:

identifying radio stations that have substantially no content.

9. The method of claim 1 currently amended, where storing the list of preferred radio stations comprises:

storing a broadcast channel of each radio station in the list of preferred radio stations; and storing a location of the wireless receiver.

10. The method of claim 1, further comprising:

in response to user input, selecting a radio station of the list of preferred radio stations.

11. A wireless receiver comprising:

a scanner operable to scan a plurality of radio broadcast channels to find available radio stations in response to a scan event;

a station list editor operable to remove radio stations of the available radio stations that fail to meet a preference criterion to form a list of preferred radio stations; and a memory operable to store the list of preferred radio stations;

a scan event generator; and a scan event detector arranged to detect the scan event, where the scan event detector is operable to detect connection of an ear-phone to a playback circuit of the wireless receiver, and wherein detecting the scan event comprises a signal quality analyzer detecting signal quality below a set threshold.

12. The wireless receiver of claim 11, wherein detecting the scan event comprises a timer detecting a timed event.

13. The wireless receiver of claim 11, wherein detecting the scan event further comprising:

a locator detecting a geographical location of the wireless receiver; and comparing the location of the wireless receiver to a previous location of the wireless receiver associated with a previous scan event.

14. The wireless receiver of claim 11, wherein the memory is operable to store a list of user preferences relating to radio stations, and where the station list editor is responsive to the list of user preferences.

15. The wireless receiver of claim 11, further comprising an analysis module operable to determine a content classification of a radio station, wherein the station list editor is responsive to the analysis module.

16. The wireless receiver of claim 15, wherein the analysis module comprises a Radio Data System (RDS) receiver.

17. The wireless receiver of claim 11, further comprising an analysis module operable to monitor signal quality of a radio station signal, wherein the station list editor is responsive to the analysis module.

18. The wireless receiver of claim 11, further comprising a user interface to enable input of user preferences relating to radio stations.

19. A non-transitory computer-readable medium having computer-executable instructions that, when executed by a processor, manage preferred radio stations in a wireless receiver by causing the processor to:

in response to detection of a scan event, scan a plurality of broadcast channels to detect available radio stations of the plurality of radio broadcast channels to find available radio stations;

identify radio stations of the available radio stations that fail to meet a preference criterion;

remove the identified radio stations from the available radio stations to form a list of preferred radio stations that meet the preference criterion;

store the list of preferred radio stations;

generate a scan event when an ear-phone is connected to a playback circuit of the wireless receiver; and generate a scan event automatically when signal quality of a broadcast radio signal falls below a set threshold.

* * * * *